United States Patent
Chen et al.

(10) Patent No.: US 11,460,891 B2
(45) Date of Patent: Oct. 4, 2022

(54) ELECTRONIC DEVICE

(71) Applicants: I-Lung Chen, Taipei (TW); Wang-Hung Yeh, Taipei (TW); Hsiao-Ching Hung, Taipei (TW); Li-Chun Lee, Taipei (TW); Shih-Chia Liu, Taipei (TW); Kun-Rong Lin, Taipei (TW)

(72) Inventors: I-Lung Chen, Taipei (TW); Wang-Hung Yeh, Taipei (TW); Hsiao-Ching Hung, Taipei (TW); Li-Chun Lee, Taipei (TW); Shih-Chia Liu, Taipei (TW); Kun-Rong Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 252 days.

(21) Appl. No.: 16/856,041

(22) Filed: Apr. 23, 2020

(65) Prior Publication Data
US 2020/0341520 A1 Oct. 29, 2020

Related U.S. Application Data

(60) Provisional application No. 62/838,316, filed on Apr. 25, 2019.

(51) Int. Cl.
*H01Q 1/00* (2006.01)
*G06F 1/16* (2006.01)
*H01Q 1/22* (2006.01)

(52) U.S. Cl.
CPC .......... *G06F 1/1656* (2013.01); *G06F 1/1616* (2013.01); *G06F 1/1637* (2013.01); *H01Q 1/2266* (2013.01)

(58) Field of Classification Search
CPC .... G06F 1/1616; G06F 1/1637; G06F 1/1656; G06F 1/1698; H01Q 1/2266
See application file for complete search history.

(56) References Cited

U.S. PATENT DOCUMENTS 9,548,525 B2 * 1/2017 Toh .............. H01Q 1/2291
9,612,582 B1 * 4/2017 Wang .............. G04R 60/02
(Continued)

FOREIGN PATENT DOCUMENTS

| CN | 2867727 | 2/2007 |
|---|---|---|
| CN | 1317904 | 5/2007 |

(Continued)

OTHER PUBLICATIONS

"Office Action of China Counterpart Application", dated Sep. 3, 2021, p. 1-p. 6.

(Continued)

*Primary Examiner* — Thien M Le
(74) *Attorney, Agent, or Firm* — JCIPRNET

(57) ABSTRACT

An electronic device including a device body, a first antenna module, a second antenna module, and an electrically conductive structure is provided. The first antenna module is disposed on the device body, and the second antenna module is disposed on the device body. The electrically conductive structure includes a first section and a second section, and the first section is connected between the first antenna module and the second section. The first section is extended along a first direction, the second section is extended toward the second antenna module along a second direction not parallel to the first direction, and the second section and the second antenna module have a gap therebetween.

8 Claims, 4 Drawing Sheets

(56) References Cited

U.S. PATENT DOCUMENTS

| | | | | |
|---|---|---|---|---|
| 9,912,042 B2* | 3/2018 | Liu | ........................ | G04R 60/08 |
| 2013/0016024 A1* | 1/2013 | Shi | ........................ | H01Q 5/371 |
| | | | | 29/729 |
| 2014/0266923 A1* | 9/2014 | Zhou | ........................ | H01Q 9/06 |
| | | | | 343/702 |
| 2017/0033439 A1* | 2/2017 | Liu | ........................ | G04R 60/08 |
| 2017/0093019 A1* | 3/2017 | Toh | ........................ | H01Q 9/42 |
| 2018/0183140 A1* | 6/2018 | Liu | ........................ | H01Q 1/243 |
| 2018/0331415 A1* | 11/2018 | Wu | ........................ | H01Q 13/085 |

FOREIGN PATENT DOCUMENTS

| | | |
|---|---|---|
| CN | 202111753 | 1/2012 |
| CN | 205039237 | 2/2016 |
| CN | 103650239 | 11/2016 |
| CN | 106935964 | 12/2019 |
| TW | I259353 | 8/2006 |
| TW | I337426 | 2/2011 |

OTHER PUBLICATIONS

"Office Action of Taiwan Counterpart Application", dated Nov. 20, 2020, p. 1-p. 5.

* cited by examiner

ELECTRONIC DEVICE

CROSS-REFERENCE TO RELATED APPLICATION

This application claims the priority benefit of U.S. provisional application Ser. No. 62/838,316, filed on Apr. 25, 2019. The entirety of the above-mentioned patent application is hereby incorporated by reference herein and made a part of specification.

FIELD OF THE INVENTION

The invention relates to an electronic device, and particularly to an electronic device including an antenna.

DESCRIPTION OF RELATED ART

With the advancement of technology, the current public communication method has gradually changed to wireless communication, such as smart phones, tablet PCs and notebook computers with wireless internet access, etc., which are all in the field of wireless communication. Usually, wireless communication requires the use of antennas to transmit messages. In order to meet consumers' needs for wireless communication, some notebook computers are equipped with a plurality of antenna modules. However, under the trend of a lean and thin design of notebook computers, the space and location of antenna modules are limited. Therefore, how to properly configure a plurality of antenna modules with good signal transceiving capability in a limited configuration space and location is an important issue in this field.

SUMMARY OF THE INVENTION

The invention provides an electronic device that may be properly provided with a plurality of antenna modules with good signal transceiving capability.

An electronic device of the invention includes a device body, a first antenna module, a second antenna module, and an electrically conductive structure. The first antenna module is disposed on the device body, and the second antenna module is disposed on the device body. The electrically conductive structure includes a first section and a second section, and the first section is connected between the first antenna module and the second section. The first section is extended along a first direction, the second section is extended toward the second antenna module along a second direction not parallel to the first direction, and the second section and the second antenna module have a gap therebetween.

In an embodiment of the invention, the first direction and the second direction are perpendicular to each other.

In an embodiment of the invention, the first antenna module and the second antenna module are located in the device body, and at least a portion of the electrically conductive structure is extended outside the device body.

In an embodiment of the invention, the first antenna module, the second antenna module, and the electrically conductive structure are all located in the device body.

In an embodiment of the invention, the device body has a first side and a second side adjacent to each other, wherein the first antenna module is disposed along the first side, and the second antenna module is disposed along the second side.

In an embodiment of the invention, the electrically conductive structure is disposed at a corner of the device body located between the first side and the second side.

In an embodiment of the invention, the electronic device includes a display, wherein the display is pivotally connected to the device body, and the corner is located at an end of the device body away from the display.

In an embodiment of the invention, the device body has a missing corner between the first side and the second side, and the electrically conductive structure is located at the missing corner and at least partially exposed by the device body.

Based on the above, the electronic device of the invention is additionally provided with an electrically conductive structure connected to the first antenna module. The electrically conductive structure includes a first section and a second section respectively having different extending directions. Therefore, the electrically conductive structure may have suitable extending methods based on the signal transceiving requirements of the first antenna module and the structural design requirements of the device body, so as to improve the signal transceiving capability of the first antenna module in accordance with the structural design of the device body. In addition, the second section of the electrically conductive structure is extended toward the second antenna module and the two have a gap therebetween, so that the first antenna module, the second antenna module, and the electrically conductive structure may have a centralized configuration without affecting the antenna characteristics of the second antenna module. As a result, the configuration space of the electronic device is reduced.

DESCRIPTION OF THE EMBODIMENTS

Figure 1:
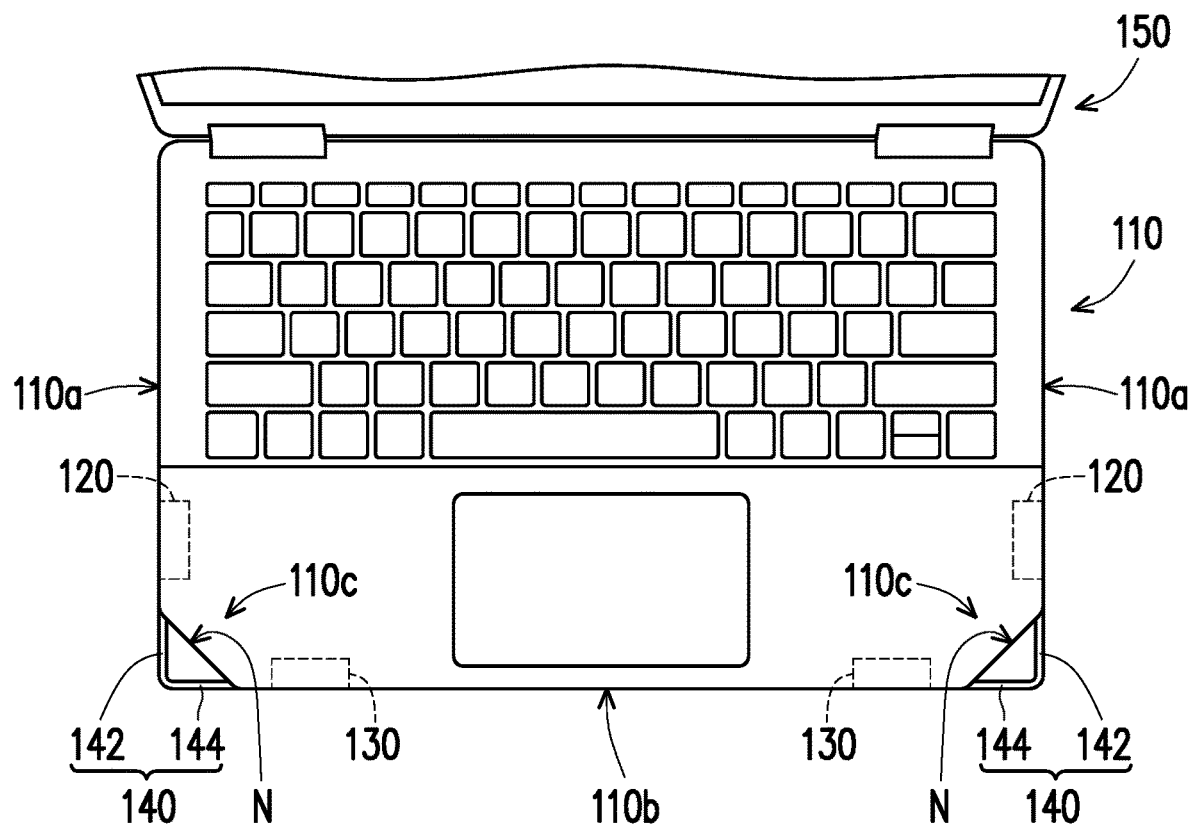
FIG. 1 is a partial top view of an electronic device of an embodiment of the invention.

FIG. 1 is a partial top view of an electronic device of an embodiment of the invention. Referring to FIG. 1, an electronic device 100 of the present embodiment includes a device body 110, at least one first antenna module 120 (shown as two), at least one second antenna module 130 (shown as two), and at least one electrically conductive structure 140 (shown as two). The first antenna module 120 and the second antenna module 130 are disposed in the device body 110 and are, for example, different types of antenna modules that may include various antenna modules applied to long term evolution (LTE) wireless communication technology and various antenna modules applied to a multiple input multiple output (MIMO) wireless communication system, and the invention is not limited in this regard.

The electronic device 100 of the present embodiment is, for example, a notebook computer, and the device body 110 is, for example, a host of a notebook computer. The electronic device 100 further includes a display 150. The display 150 is pivotally connected to the device body 110 and may be opened or closed relative to the device body 110. In other embodiments, the electronic device 100 may be other types of electronic products, and the invention is not limited in this regard.

Figure 2:
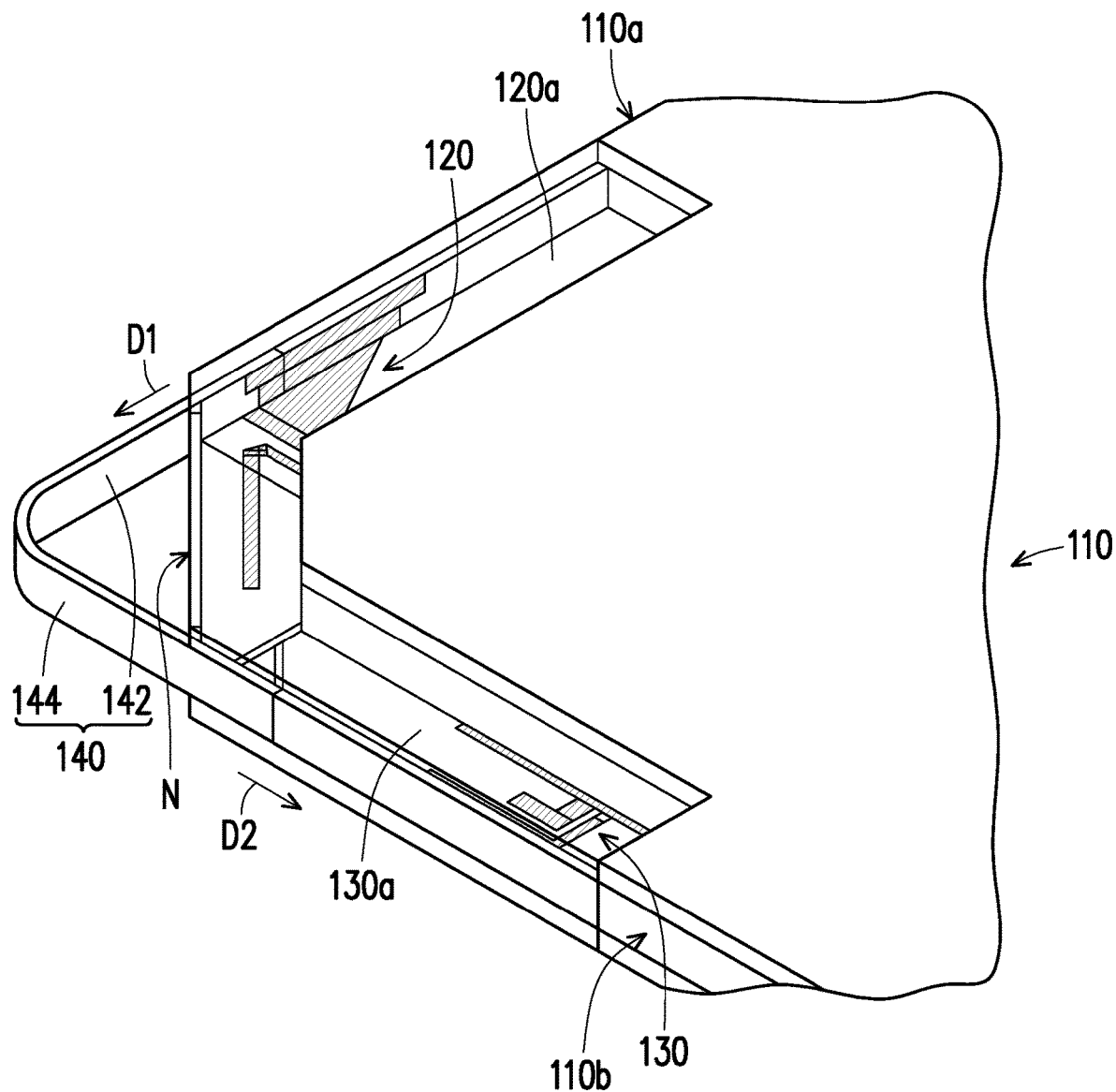
FIG. 2 is a partial perspective view of the electronic device of FIG. 1.
Figure 3:
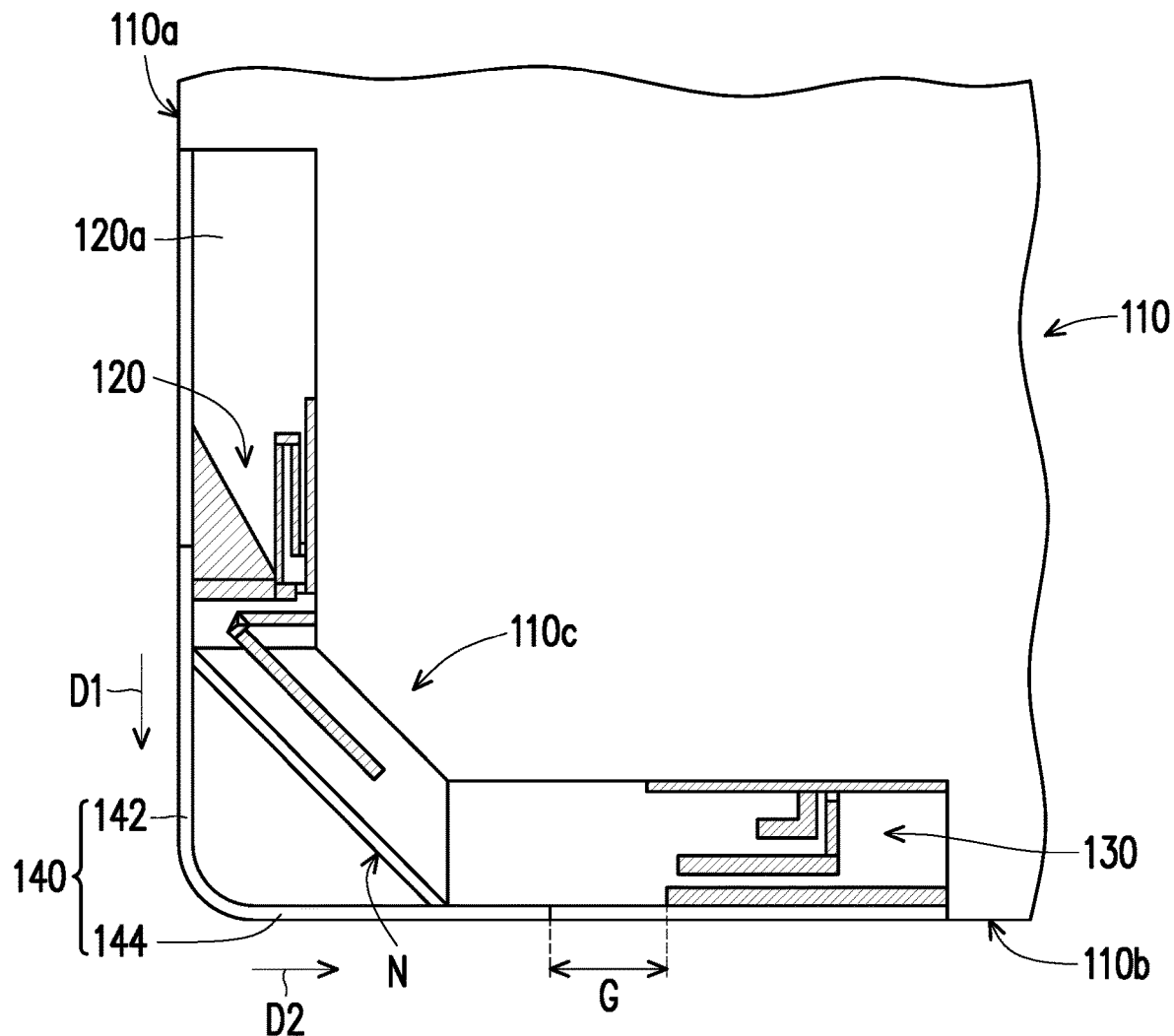
FIG. 3 is a top view of the electronic device of FIG. 2.

FIG. 2 is a partial perspective view of the electronic device of FIG. 1. FIG. 3 is a top view of the electronic device of FIG. 2. Referring to FIG. 2 and FIG. 3, in the present embodiment, the electrically conductive structure 140 is, for example, a metal member and includes a first section 142 and a second section 144. The first section 142 is connected between the first antenna module 120 and the second section 144. The first section 142 is extended along a first direction D1, the second section 144 is extended toward the second antenna module 130 along a second direction D2 not parallel to the first direction D1, and the second section 144 and the second antenna module 130 have a gap G therebetween.

In the present embodiment, the first antenna module 120 and the second antenna module 130 are respectively disposed on supporting structures 120a and 130a, respectively. The first section 142 of the electrically conductive structure 140 is overlapped with the supporting structure 120a and connected to the first antenna module 120, and the second section 144 of the electrically conductive structure 140 is overlapped with the supporting structure 130a and not connected to the second antenna module 130. The supporting structures 120a and 130a may be a portion of the plastic casing of the device body 110, or may be an antenna substrate disposed on the device body 110, and the invention is not limited in this regard. In addition, in the present embodiment, the extending direction (the first direction D1) of the first section 142 of the electrically conductive structure 140 and the extending direction (the second direction D2) of the second section 144 of the electrically conductive structure 140 are, for example, perpendicular to each other. However, the invention is not limited thereto. According to design requirements, the extending direction of the first section 142 and the extending direction of the second section 144 may be inclined to each other.

As described above, the electronic device 100 of the present embodiment is additionally provided with an electrically conductive structure 140 connected to the first antenna module 120. The electrically conductive structure 140 includes the first section 142 and the second section 144 respectively having different extending directions. Therefore, the electrically conductive structure may have suitable extending methods based on the signal transceiving requirements of the first antenna module 120 and the structural design requirements of the device body 110, so as to improve the signal transceiving capability of the first antenna module 120 in accordance with the structural design of the device body 110. Specifically, the electrically conductive structure 140 may be regarded as a portion of the radiating portion of the first antenna module 120, and the total extending length of the first antenna module 120 and the electrically conductive structure 140 may be determined based on the frequency band of the signal to be transmitted and received by the first antenna module 120 to amplify the low frequency band of the first antenna module 120 via the electrically conductive structure 140. The invention does not limit the actual size of the electrically conductive structure 140.

In addition, the second section 144 of the electrically conductive structure 140 is extended toward the second antenna module 130 and the two have the gap G therebetween, so that the first antenna module 120, the second antenna module 130, and the electrically conductive structure 140 may have a centralized configuration without affecting the antenna characteristics of the second antenna module 130. As a result, the configuration space of the electronic device 100 is reduced.

Please refer to FIG. 1. In the present embodiment, the device body 110 has a first side 110a (shown as two) and a second side 110b adjacent to each other. The first antenna module 120 is disposed along the first side 110a of the device body 110, and the second antenna module 130 is disposed along the second side 110b of the device body 110. The electrically conductive structure 140 is disposed at a corner 110c (shown as two) of the device body 110 located between the first side 110a and the second side 110b. The corner 110c is located at an end of the device body 110 away from the display 150, for example. In other embodiments, the first antenna module 120 and the second antenna module 130 may be disposed at other suitable positions of the device body 110, and the invention is not limited in this regard.

In the present embodiment, the device body 110 has a missing corner N (shown as two) at the corner 110c (marked in FIG. 1) between the first side 110a and the second side 110b, and a portion of the electrically conductive structure 140 is extended outside the device body 110 and located at the missing corner N to be exposed by the device body 110, so that the first antenna module 120 has better signal transceiving capability via the exposed electrically conductive structure 140. However, the invention is not limited thereto, and description is provided below with reference to a figure.

Figure 4:
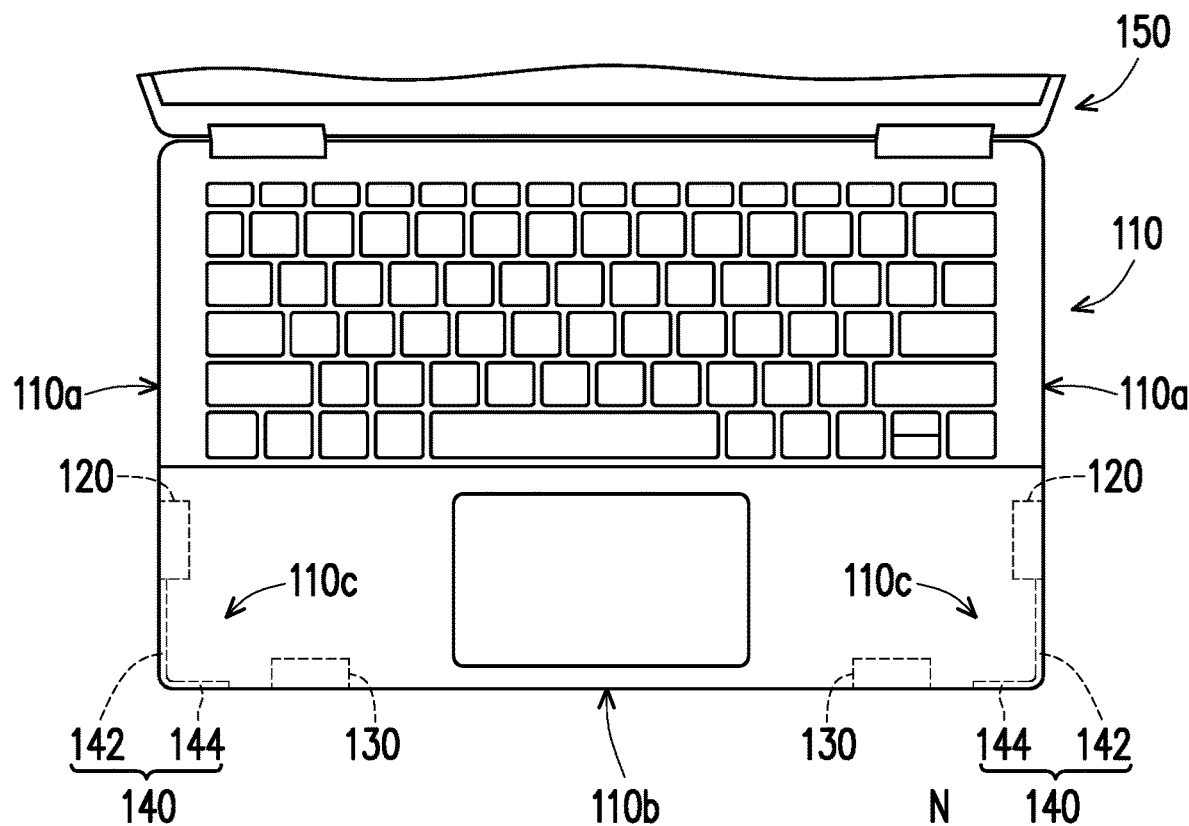
FIG. 4 is a partial top view of an electronic device of another embodiment of the invention.

FIG. 4 is a partial top view of an electronic device of another embodiment of the invention. The difference between an electronic device 100A of FIG. 4 and the electronic device 100 of FIG. 1 is that the device body 110 of the electronic device 100A does not have a missing corner at the corner 110c thereof, and the electrically conductive structure 140 is located in the device body 110 without being exposed, so that the appearance of the device body 110 at the corner 110c thereof is more visually continuous.

Based on the above, the electronic device of the invention is additionally provided with an electrically conductive structure connected to the first antenna module. The electrically conductive structure includes a first section and a second section respectively having different extending directions. Therefore, the electrically conductive structure may have suitable extending methods based on the signal transceiving requirements of the first antenna module and the structural design requirements of the device body, so as to improve the signal transceiving capability of the first antenna module in accordance with the structural design of the device body. In addition, the second section of the electrically conductive structure is extended toward the second antenna module and the two have a gap therebetween, so that the first antenna module, the second antenna module, and the electrically conductive structure may have a centralized configuration without affecting the antenna characteristics of the second antenna module. As a result, the configuration space of the electronic device is reduced. Furthermore, the electrically conductive structure may be designed to be exposed to the device body, so that the first antenna module has better signal transceiving capability via the electrically conductive structure. Alternatively, the electrically conductive structure may be designed not to be exposed to the device body, so that the appearance of the device body where the conductive structure is located is more visually continuous.

What is claimed is:
1. An electronic device, comprising:
  a device body comprising at least one supporting structure;
  a first antenna module disposed on the at least one supporting structure;

a second antenna module disposed on the at least one supporting structure; and an electrically conductive structure overlapped with the at least one supporting structure, wherein a portion of the electrically conductive structure is extended outside the at least one supporting structure, the electrically conductive structure comprises a first section and a second section, the first section is connected between the first antenna module and the second section, the first section is extended along a first direction, the second section is extended toward the second antenna module along a second direction not parallel to the first direction, and the second section and the second antenna module have a gap therebetween.

2. The electronic device of claim 1, wherein the first direction and the second direction are perpendicular to each other.

3. The electronic device of claim 1, wherein the first antenna module and the second antenna module are located in the device body, and at least a portion of the electrically conductive structure is extended outside the device body.

4. The electronic device of claim 1, wherein the first antenna module, the second antenna module, and the electrically conductive structure are all located in the device body.

5. The electronic device of claim 1, wherein the device body has a first side and a second side adjacent to each other, wherein the first antenna module is disposed along the first side, and the second antenna module is disposed along the second side.

6. The electronic device of claim 5, wherein the electrically conductive structure is disposed at a corner of the device body located between the first side and the second side.

7. The electronic device of claim 6, comprising a display, wherein the display is pivotally connected to the device body, and the corner is located at an end of the device body away from the display.

8. The electronic device of claim 5, wherein the device body has a missing corner between the first side and the second side, and the electrically conductive structure is located at the missing corner and at least partially exposed by the device body.

* * * * *